UNITED STATES PATENT OFFICE.

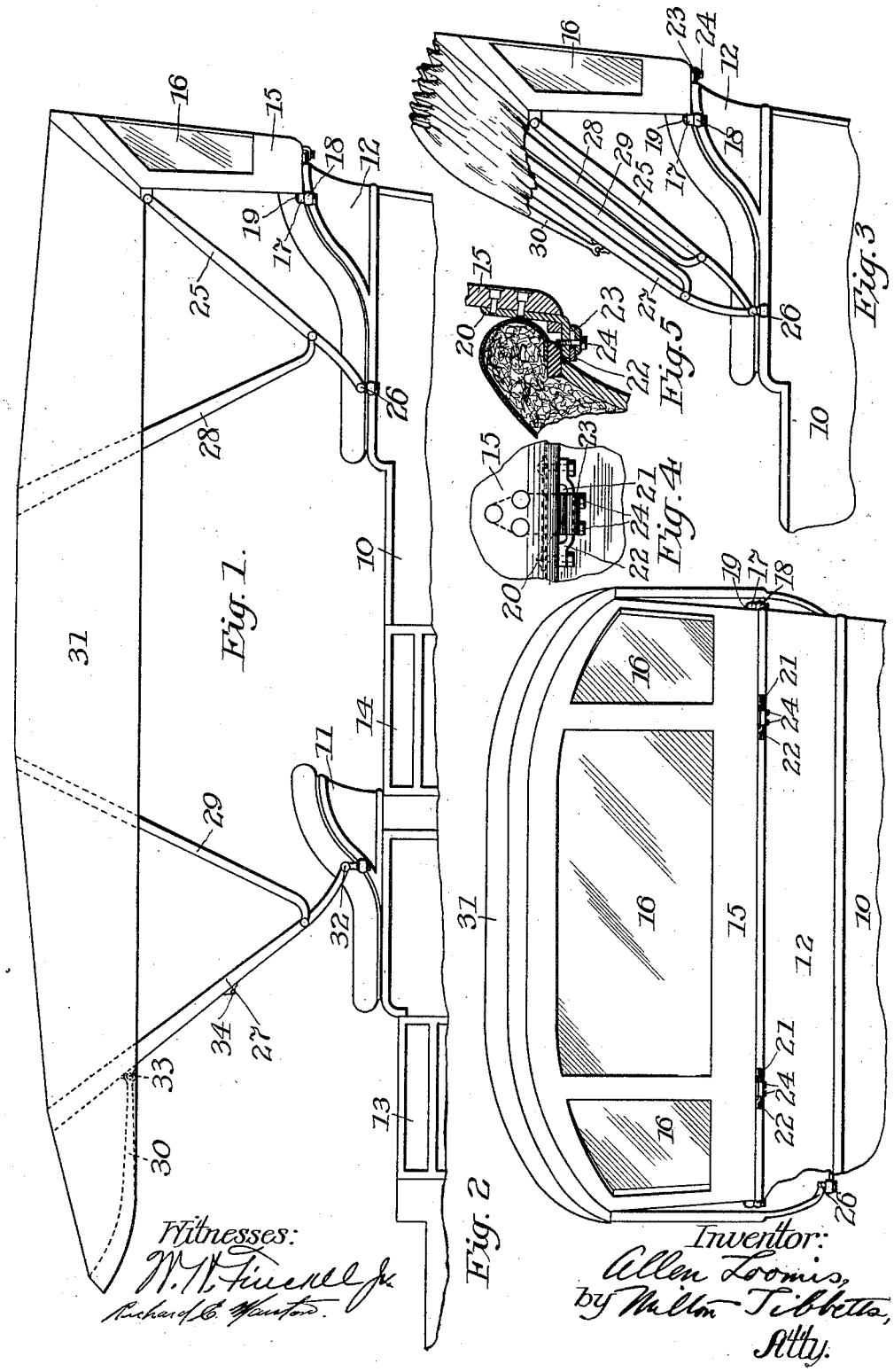

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

VEHICLE-CANOPY.

1,071,066.   Specification of Letters Patent.   Patented Aug. 26, 1913.

Application filed March 27, 1911. Serial No. 617,320.

*To all whom it may concern:*

Be it known that I, ALLEN LOOMIS, a citizen of the United States, and resident of Detroit, Wayne county, State of Michigan, have invented certain new and useful Improvements in Vehicle-Canopies, of which the following is a specification.

This invention relates to canopies for vehicles, and particularly to canopies or tops adapted for attachment to motor vehicles or motor boats.

Some of the objects of the invention are to produce a vehicle canopy which may be easily applied to or removed from the vehicle, one which will have a rigid back portion so that comparatively large panes of glass may be used therein for giving the vehicle driver a clear view of the road in the rear, and one in which the top proper may be folded against the back portion in a somewhat diagonal position so that the back portion itself may still be retained in upright position to act as a partial protection to the occupants of the rear seat from wind or dust.

Other objects will appear from the following description and claim taken in connection with the drawings, in which—

Figure 1 is a side elevation of a portion of a motor vehicle body with a canopy thereon built in accordance with this invention; Fig. 2 is a rear view of what is shown in Fig. 1; Fig. 3 is a side elevation similar to Fig. 1 with the top in folded position; and Figs. 4 and 5 are detail views.

In the drawings, 10 represents a vehicle body, in this instance a motor vehicle body, and it is shown as comprising front seats 11 and rear seats 12 with a door 13 to the front compartment and a door 14 to the rear compartment.

Mounted on the back of the rear seat 12 and extending substantially upright therefrom is the rigid portion 15 of a canopy and this rigid portion comprises a framework having openings 16 which may be provided with glass so that it acts as a rear wind and dust shield and yet it does not obstruct the rear view of the driver or other occupants of the vehicle. This back portion 15 or "glass back" as it is called, is supported on the vehicle body by several irons, the two outside ones of which are shown at 17 and each comprises an eye adapted to rest on a similar iron 18 on the vehicle body and the two irons are secured together by a vertical bolt 19 passing through the eyes. The two intermediate irons shown are in the form of L-shaped pieces 20, the vertical portion of each of these pieces being suitably secured to the back 15 and the horizontal portion is adapted to enter a socket 21 formed in the body and it may be secured to the socket member 22 by a clamp 23 and bolts 24 threaded into the horizontal portion of the piece 20. The glass back is also in part supported by a forwardly and diagonally extending brace bar 25 on each side of the body extending from near the top of the glass back to a suitable position on the side of the vehicle body where it is bolted to the latter as at 26.

From the above it will be seen that the glass back is secured to the vehicle body by the various bolts and clamps mentioned and it may be removed therefrom by removing the two bolts 19 and the two bolts at 26 and loosening the clamps 23. This will permit the glass back to be moved rearwardly, withdrawing the pieces 20 from the sockets 21. By the arrangement of bolts and clamps shown, it is only necessary to have the four eyes 17 and 18 exactly alined and the other bolts and clamps need be only substantially in correct position.

Detachably pivoted to a suitable part of the front seat of the vehicle body is the forward main bow 27 which, in operative position, extends diagonally upwardly and forwardly from its pivot and substantially at right angles to the brace bow or arm 25. Pivoted respectively to the brace bow 25 and the forward main bow 27 are the secondary bows 28 and 29 which extend, respectively, diagonally forwardly and diagonally rearwardly from their pivots. An auxiliary bow 30 extends from a point near the upright part of the forward main bow 27 substantially in a horizontal plane forwardly therefrom, and all of the bows mentioned are so arranged and constructed as to support the top portion 31 of the vehicle canopy. The top material is suitably stretched on the bows as is well known in the art and it will be understood that the forward main bow 27 may be removed from its pivot 32 and connected to an auxiliary pivot at 26 and all of the bows folded against each other and particularly against the brace bow 25, thus folding the top to the position shown in Fig. 3.

It will be noted that the secondary bows 28 and 29 are pivoted to their respective bows 25 and 27 at points distant from the tops of said latter bows substantially equal to the length of the secondary bows, whereby, when the top is in folded position as shown in Fig. 3, all of the bows lie symmetrically against each other and the top material is conveniently folded between the bows. It will also be noted that the auxiliary bow 30, when in operative position, rests on a pivot 33 near the top of the main bow 27, as shown in Fig. 1, and in folded position the end of the auxiliary bow 30 rests on a pivot 34 which is located on the bow 27 at a distance from the top thereof substantially equal to the length of the auxiliary bow 30, whereby this bow also folds evenly against the adjacent bow.

Various modifications of the invention may be made to adapt it to different styles of motor vehicles and other vehicles, without departing from the spirit of the invention.

Having thus described my invention, what I claim is:

The combination with a motor vehicle body having front and rear seats, said seats having supporting backs for the occupants, of an upright back comprising a framework having openings and glass in said openings thereby giving an unobstructed rear view for the occupants, said framework being mounted directly upon the rear supporting back and detachably secured thereto, a brace bar on each side of said vehicle extending from the top of said frame-work diagonally forward to the vehicle body, a folding top extending forwardly from said back over both of said seats and having its rear bow only mounted directly upon said brace bars, said top being foldable to a position with all of its bows resting against said diagonal brace bars and with the top fabric above said glazed openings so that the rear view is unobstructed when the top is folded.

In testimony whereof I affix my signature in the presence of two witnesses.

ALLEN LOOMIS.

Witnesses:
W. H. FINEDEL, Jr.,
E. L. KIEHNE.

---

Copies of this patent may be obtained for five cents each, by addressing the "Commissioner of Patents, Washington, D. C."